Patented Aug. 5, 1952

2,606,208

UNITED STATES PATENT OFFICE 2,606,208

AMINOALKYL HYDROXYNAPHTHYL KETONES AND SALTS THEREOF

Robert R. Burtner, Skokie, Ill., assignor to G. D. Searle & Co., Skokie, Ill., a corporation of Illinois No Drawing. Application April 17, 1948, Serial No. 21,759

10 Claims. (Cl. 260—570.5)

This invention relates to aminoalkyl hydroxynaphthyl ketones and salts thereof, and to processes for preparing such substances. In particular, it relates to basic ketones having the following general structural formula

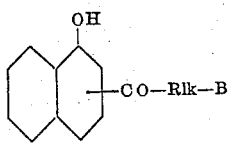

wherein Alk is an alkylene radical having two carbon atoms between the groups CO and B, and wherein B is a secondary or tertiary aliphatic-type amino radical, and salts thereof.

The compounds to which this invention relates are useful as chemical intermediates in the preparation of dye-stuffs, pharmaceuticals, and pesticides. They are also of value as antiseptics and as medicinal agents. It is the purpose of this invention to provide useful substances for the foregoing purposes, as well as efficient methods for manufacturing such substances.

In the foregoing structural formula, Alk represents a vicinyl alkylene radical containing two to ten carbon atoms, wherein the substituent groups CO and B are attached to adjacent carbon atoms of the alkylene radical. Alk, therefore, represents radicals such as ethylene, propylene, 1,2-butylene, 2,3-butylene, 1,2-amylene, 2,3-amylene, and related bivalent aliphatic hydrocarbon radicals having two carbon atoms between the CO and B groups. The carbonyl group in the foregoing structural formula is attached to the benzenoid ring bearing the phenolic hydroxyl radical. The amino grouping B represents secondary and tertiary lower mono- and dialkylamino radicals, as well as cyclic secondary amino radicals such as piperidino, pyrrolidino, morpholino, piperazino, thiamorpholino, and C-alkylated cyclic amino radicals relating to the same, such as lupetidino, pipecolino, copellidino, homopyrrolidino and the like. The amino group B is derived from a primary or secondary organic base of the aliphatic or aliphatic-type heterocyclic series, having an ionization constant in the range of about $10^{-3}$ to $10^{-6}$. In broad terms, B represents NRR' and

wherein R is an alkyl or hydroxyalkyl or related group and R' is an alkyl or related group or hydrogen, and wherein Z represents the atoms required to form with N a cyclic aliphatic-type secondary amine. As used herein, the term a primary amino radical refers to a secondary or tertiary amino radical of the foregoing type. The term lower alkyl radical refers to alkyl radicals containing from one to five carbon atoms. When B represents a dialkylamino radical, the alkyl groups may be the same or different, and may be straight- or branched-chained.

The amino ketones which make up this invention are only slightly soluble in water, but are generally soluble in the common organic solvents. They readily form salts with acids, which salts are generally water soluble. Among the acids which are suitable for forming such salts are hydrochloric, hydrobromic, sulfuric, phosphoric, tartaric, citric, sulfamic, acetic, malic, maleic, benzoic, and similar common organic and inorganic acids which provide anions which are non-toxic in usual dosages. Salts may also be formed by reacting the basic ketones with reactive esters of strong acids, to form quaternary ammonium salts. Such salts can be formed, for example, by reaction with esters such as methyl iodide, methyl chloride, ethyl bromide, propyl chloride, benzyl chloride, phenethyl bromide, dimethyl sulfate, methyl toluenesulfonate, ethyl benzenesulfonate, and related esters.

My invention is further disclosed by the following compounds and structural formulas which are representative of the substances within its scope.

A. β-Dimethylaminoisopropyl 1-hydroxy-2-naphthyl ketone, which has the formula

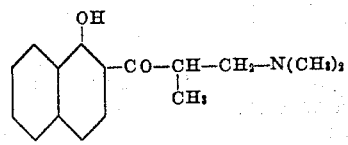

B. β - Dipropylaminoisopropyl 1 - hydroxy - 2 - naphthyl ketone, having the formula

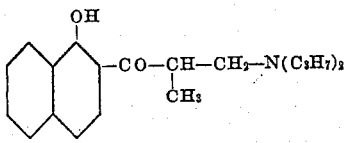

C. β-Dimethylaminoethyl 1-hydroxy-2-naphthyl ketone, having the formula

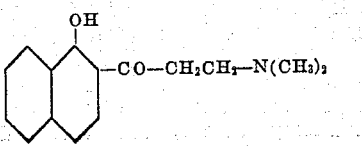

D. β-Dimethylaminoisopropyl 1-hydroxy-4-naphthyl ketone, of the formula

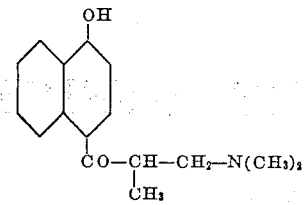

E. α-(Morpholinomethyl)propyl 1-hydroxy-4-naphthyl ketone, of the formula

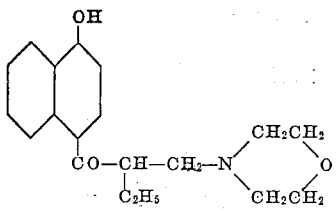

F. β-Methylethylaminoethyl 1-hydroxy-4-naphthyl ketone, having the formula

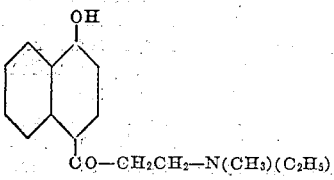

G. β-Methylaminoisopropyl 1-hydroxy-2-naphthyl ketone, which has the formula

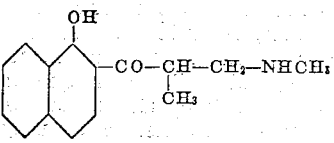

H. β-Pyrrolidinoethyl 1-hydroxy-2-naphthyl ketone, of the formula

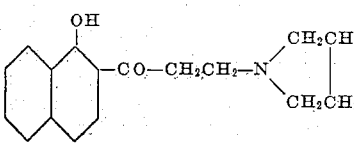

I. β-Dimethylamino-t-butyl 1-hydroxy-2-naphthyl ketone, of the formula

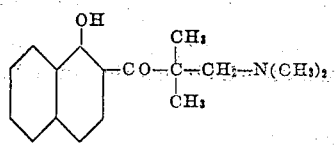

The compounds of this invention are prepared by reacting an ester of a hydroxynaphthyl alkyl ketone of the formula

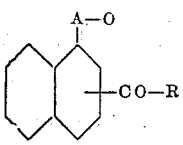

wherein A is a lower acyl radical, such as acetyl, propionyl, benzoyl, or the like, and wherein R is a lower alkyl radical, with a slight excess of a secondary or primary aliphatic-type amine or amine salt, in the presence of 1.5–2 equivalents of formaldehyde or a formaldehyde-releasing substance. In the structural formula above, the group A represents aliphatic or aromatic acid radicals. Generally, the reaction is carried out at elevated temperatures, between 50 and 150° C., in the presence of an inert solvent such as a lower alcohol or aqueous dilution thereof. After the completion of the reaction, which takes several hours at reflux temperature, the reaction mixture is decomposed with strong acid, and the basic ketones are isolated from the acid solution by the conventional method of treatment with alkali and separation of the basic ketones, as for example, by extraction.

My invention is further disclosed by the following examples, which illustrate specific embodiments of the invention, but which are in no way to be construed as limiting the invention in spirit or in scope. Quantities of materials are given in parts by weight.

Example 1

A. To a solution of 78 parts of 2-propionyl-1-naphthol in 180 parts of pyridine are added with agitation, in 6 portions over a 10-minute period, 130 parts of acetic anhydride. The mixture is allowed to stand at room temperature for 24 hours, and then the solvent is stripped off under vacuum. The residue is poured into 500 parts of ice containing 30 parts of concentrated hydrochloric acid. The granular precipitate of 1-acetoxy-2-propionylnaphthalene is ground to a thin suspension in cold N/10 hydrochloric acid, filtered, washed with cold water, and dried. After recrystallization from methanol, using decolorizing charcoal, it melts at 103° centigrade.

B. A solution of 121 parts of 2-propionyl-1-acetoxynaphthalene, 43 parts of dimethylamine hydrochloride, and 43 parts of paraformaldehyde in 810 parts of isoamyl alcohol is refluxed for 30 minutes. The solution is chilled, and colorless crystals of unchanged ketone are removed by filtration. The filtrate is stripped of solvent under reduced pressure, and the residue is taken up in 1000 parts of water containing 100 parts of concentrated hydrochloric acid. The acid solution is filtered and the filtrate is extracted with ether to remove neutral material. The acid filtrate is then made alkaline to phenolphthalein with 10% sodium hydroxide solution. The yellow precipitate of β-dimethylaminoisopropyl 1-hydroxy-2-naphthyl ketone (Compound A) is taken up in ether. The ether solution is dried and treated with one equivalent of absolute alcoholic hydrogen chloride. The precipitate of β-dimethylaminoisopropyl 1-hydroxy-2-naphthyl ketone hydrochloride crystallizes on standing and is removed by filtration. It is recrystallized from absolute ethanol and melts at about 193° C. It gives a strong ferric chloride test and is amphoteric in nature, indicating that the acetoxy group is hydrolyzed during the reaction.

By a method similar to the foregoing, using 430 parts of dipropylamine hydrochloride in place of the dimethylamine hydrochloride, there is formed β-dipropylaminoisopropyl 1-hydroxy-2-naphthyl ketone (Compound B) which can be isolated by the foregoing method.

Example 2

229 parts of 2-acetyl-1-acetoxynaphthalene, 85 parts of dimethylamine hydrochloride, 85 parts of paraformaldehyde and 1500 parts of absolute alcohol are refluxed overnight. The mixture is stripped of the bulk of the solvent and quenched in 2000 parts of water containing 200 parts of muriatic acid. After filtration the acid solution is made slightly alkaline with dilute caustic soda. There is formed in this way a precipitate of β-dimethylaminoethyl 1-hydroxy-2-naphthyl ketone (Compound C), By a method analogous to the foregoing, but employing 100 parts of methylethylamine hydrochloride instead of dimethylamine hydrochloride, there is produced β-methylethylaminoethyl 1-hydroxy-2-naphthyl ketone.

*Example 3*

A. To a solution of 44.5 parts of 4-propionyl-1-naphthol in 100 parts of pyridine are added, in 4 portions with agitation, 74.5 parts of acetic anhydride. The reaction is then allowed to stand at room temperature for about 24 hours. The solvent is stripped off under vaccum, and the residue is poured into 500 parts of ice containing 30 parts of concentrated hydrochloric acid. The precipitate of 1-acetoxy-4-propionyl-naphthalene granulates on standing. It is collected on a filter, washed with water, and dried. After recrystallization from cyclohexane, it melts at 89° C.

B. A solution of 861 parts of 1-acetoxy-4-propionyl-naphthalene, 280 parts of dimethylamine hydrochloride, and 115 parts of paraformaldehyde in 5500 parts of absolute ethanol is refluxed for 16 hours. The solution is poured into 10,000 parts of water containing 360 parts of concentrated hydrochloric acid. The supernatant liquid is decanted and treated with decolorizing charcoal. The acid solution is filtered and made alkaline with 40% caustic soda solution. The base which precipitates redissolves except for a small amount of tarry material. This is removed by filtration, and the clear filtrate is made acid to Congo Red. Then 10% caustic soda solution is added to precipitate the β-dimethylaminoisopropyl 1-hydroxy-4-naphthyl ketone (Compound D). The base is extracted with ether and the ether extract is dried and evaporated. The oily base is taken up in anhydrous ether, treated with decolorizing charcoal, filtered, and then treated with one equivalent of absolute alcoholic hydrogen chloride. The β-dimethylaminoisopropyl 1-hydroxy-4-naphthyl ketone hydrochloride comes down in the form of a semi-crystalline precipitate. This is recrystallized from methanol and melts at about 205° C.

I claim:

1. An aminoalkyl hydroxynaphthyl ketone, having the structural formula

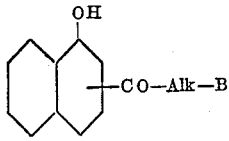

wherein Alk is an alkylene radical having two carbon atoms between the CO and B groups and containing not less than 2 and not more than 10 carbon atoms, and B is a di-(lower alkyl) amino radical and wherein the ketone group is located at one of the positions numbered 2 and 4, and salts thereof.

2. A salt of a β-di-(lower alkyl) aminoisopropyl 1-hydroxynaphthyl ketone, wherein the ketone grouping is linked to one of the positions numbered 2 and 4 of the benzenoid ring bearing the hydroxyl radical.

3. A salt of a β-di-(lower alkyl) aminoisopropyl 1-hydroxy-4-naphthyl ketone.

4. A salt of β-dimethylaminoisopropyl 1-hydroxy-4-naphthyl ketone.

5. β-Dimethylaminoisopropyl 1-hydroxy-4-naphthyl ketone hydrochloride.

6. β-Dimethylaminoisopropyl 1-hydroxy-4-naphthyl ketone.

7. A salt of a β-di-(lower alkyl) aminoisopropyl 1-hydroxy-2-naphthyl ketone.

8. A salt of β-dimethylaminoisopropyl 1-hydroxy-2-naphthyl ketone.

9. β-Dimethylaminoisopropyl 1-hydroxy-2-naphthyl ketone hydrochloride.

10. β-Dimethylaminoisopropyl 1-hydroxy-2-naphthyl ketone.

ROBERT R. BURTNER.

REFERENCES CITED

The following references are of record in the file of this patent:

UNITED STATES PATENTS

| Number | Name | Date |
| --- | --- | --- |
| 2,282,907 | Horst | May 12, 1942 |

OTHER REFERENCES

Decombe: Comptes Rend., vol. 196, pp. 866–868 (1933).

Decombe: Comptes Rend., vol. 197, pp. 258–260 (1933).

Blicke: "Organic Reactions," Wiley and Sons, Inc., New York, N. Y., 1942, vol. 1, chapter 10, "The Mannich Reaction," pp. 303–341.

Mannich et al.: Berichte, vol. 55B, pp. 3510–3526 (1922).

Fry: J. Org. Chem., vol. 10, pp. 259–262 (1945).

Karrer: "Organic Chemistry," Elsevier Publishing Co., New York, N. Y., 1946, 2nd ed., p. 425.

Conant et al.: "The Chemistry of Organic Compounds," The Macmillan Co., New York, N. Y., 3rd ed., 1947, p. 544.